US011084597B2

(12) United States Patent
Pautis et al.

(10) Patent No.: US 11,084,597 B2
(45) Date of Patent: Aug. 10, 2021

(54) ASSEMBLY FOR AIRCRAFT, COMPRISING A PRIMARY ATTACHMENT-PYLON STRUCTURE FIXED TO A WING BOX BY FASTENERS PARTIALLY EMBEDDED IN THE PRIMARY STRUCTURE

(71) Applicant: Airbus Operations SAS, Toulouse (FR)

(72) Inventors: Olivier Pautis, Merville (FR); Eric Bouchet, Aussonne (FR); Olivier Barbara, Puylaurens (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 336 days.

(21) Appl. No.: 16/197,726

(22) Filed: Nov. 21, 2018

(65) Prior Publication Data
US 2019/0152616 A1    May 23, 2019

(30) Foreign Application Priority Data
Nov. 23, 2017  (FR) ..................... 1761113

(51) Int. Cl.
| B64D 27/26 | (2006.01) |
| B64D 27/12 | (2006.01) |
| B64D 27/18 | (2006.01) |

(52) U.S. Cl.
CPC ............ *B64D 27/26* (2013.01); *B64D 27/12* (2013.01); *B64D 27/18* (2013.01); *B64D 2027/264* (2013.01); *B64D 2027/266* (2013.01); *B64D 2027/268* (2013.01)

(58) Field of Classification Search
CPC ........ B64D 2027/264; B64D 2027/266; B64D 2027/268; B64D 27/18; B64D 27/12; B64D 27/06
See application file for complete search history.

(56) References Cited

U.S. PATENT DOCUMENTS

| 4,560,122 A | 12/1985 | Parkinson et al. |
| 9,919,804 B2* | 3/2018 | Pautis ................... B64D 27/18 |
| 2010/0090056 A1* | 4/2010 | Gardes .................. B64D 27/26 244/54 |

(Continued)

FOREIGN PATENT DOCUMENTS

| FR | 2887522 A1 | 12/2006 |
| FR | 2915178 A1 | 10/2008 |
| FR | 2958266 A1 | 10/2011 |

OTHER PUBLICATIONS

French Search Report; priority document.

*Primary Examiner* — Joshua J Michener
*Assistant Examiner* — Cindi M Curry
(74) *Attorney, Agent, or Firm* — Greer, Burns & Crain, Ltd.

(57) ABSTRACT

To bring a pylon box of an aircraft engine attachment pylon as close as possible to a wing box, two lateral front fasteners are provided. Each of the fasteners comprises a clevis secured to the wing box, the clevis comprising two webs, at least one of which passes through an upper spar of the box, the upper part of one of the two opposite lateral flanges of a lower transverse rib of the box reinforcement, the upper part of an associated lateral panel, and a pin system passing through the clevis and the two upper parts.

14 Claims, 3 Drawing Sheets

(56) References Cited

U.S. PATENT DOCUMENTS

2011/0036942 A1\* 2/2011 Marche ................ B64D 27/26
 244/54
2015/0013142 A1\* 1/2015 West ...................... B64D 27/26
 29/525.08

\* cited by examiner

ASSEMBLY FOR AIRCRAFT, COMPRISING A PRIMARY ATTACHMENT-PYLON STRUCTURE FIXED TO A WING BOX BY FASTENERS PARTIALLY EMBEDDED IN THE PRIMARY STRUCTURE

CROSS-REFERENCES TO RELATED APPLICATIONS

This application claims the benefit of the French patent application No. 1761113 filed on Nov. 23, 2017, the entire disclosures of which are incorporated herein by way of reference.

BACKGROUND OF THE INVENTION

The present invention relates to the field of aircraft, and in particular to the assemblies comprising an aircraft wing and an engine attachment pylon fixed under this wing. The invention relates preferably to such assemblies intended to support dual flow engines of large diameters. An example of this type of assembly is for example disclosed in the document FR 2 887 522.

The invention applies in particular to commercial airplanes.

On existing aircraft, the engines, such as the jet engines, are suspended below the wing by complex attachment systems, also called "EMS" (for "Engine Mounting Structure"), or even attachment pylon. The attachment pylons usually employed have a primary structure, also called rigid structure, often produced in the form of a box, that is to say, produced by the assembly of bottom and top spars connected to one another by a plurality of reinforcing transverse ribs situated inside the box and at its ends. These spars are arranged as bottom and top faces, while lateral panels close the box on the lateral faces. Furthermore, the attachment pylon is arranged in the upper part of the engine, between the latter and the wing box. This clockwise position is called "at 12 o'clock."

As is known, the primary structure of these pylons is designed to allow the transmission to the wing of the static and dynamic forces generated by the engines, such as the weight, the thrust, or even the various dynamic forces, in particular, those associated with the cases of failures such as the loss of fan blades (FBO, for "Fan Blade Out"), withdrawal of the front landing gear, dynamic landing, etc.

In the attachment pylons known from the prior art as in the document FR 2 887 522, the transmission of the forces between its primary structure and the wing box is conventionally ensured by a set of attachments comprising a front attachment, a rear attachment, and an intermediate attachment, the latter being intended in particular to absorb the thrust forces generated by the engine. These attachments are conventionally interposed vertically between the wing box and the primary structure of the attachment pylon.

On recent engines, the diameter is becoming increasingly greater. For the dual-flow engines such as the jet engines, the significant bypass ratio sought leads to a particularly high bulk being obtained, since an increase in the bypass ratio unavoidably generates an increasing of the diameter of the engine, and more particularly, an increasing of the diameter of the fan casing thereof.

Consequently, with a ground clearance which is determined so as to remain acceptable from a safety point of view, the space remaining between the wing element and the engine is proving to be increasingly restricted. Because of this, it is becoming difficult to locate the attachment pylon and the various wing attachments in this remaining vertical space, usually dedicated to this location. This difficulty is all the greater as the transiting forces are also of high intensities and require appropriate dimensions for the wing box and the primary structure. Indeed, the wing box and the primary structure have to have dimensions that are sufficient to provide a mechanical strength capable of withstanding the passage of the forces from the engine to the wing element, with a low deformation under stress so as not to degrade the aerodynamic performance levels of the propulsive system.

In the prior art, many solutions have been proposed to bring the engine as close as possible to the wing element from which it is suspended, and do so in order to retain the requisite ground clearance.

Nevertheless, these solutions have to be improved on an ongoing basis to adapt to the ever-greater fan casing diameters, retained to satisfy the bypass ratio requirements.

SUMMARY OF THE INVENTION

To address this need for improvement, the subject of the invention is an assembly for aircraft comprising:
  an aircraft wing comprising a wing box;
  an engine attachment pylon arranged under the wing, the pylon comprising a primary structure in the form of a pylon box having a top spar extending at least partly under the wing box, and also having a bottom spar, two opposing lateral panels, and at least one reinforcing inner transverse rib comprising two opposing lateral flanges fixed respectively onto the two opposing lateral panels, each lateral flange being fixed onto an inner surface of its associated lateral panel which extends on either side of this flange in a longitudinal direction (X) of the assembly; and
  means for fixing the primary structure of the attachment pylon onto the wing box.

According to the invention, the fixing means comprise two front lateral attachments, each of these attachments comprising:
  a clevis secured to the wing box, the clevis comprising two webs of which at least one crosses the top spar of the pylon box to be situated at least partly inside this pylon box;
  an upper part of the associated lateral panel;
  an upper part of one of the two opposing lateral flanges of the reinforcing inner transverse rib; and
  a pin system passing through the two webs of the clevis, the upper part of the associated lateral panel, and the upper part of the lateral flange.

By virtue of the proposed arrangement, the primary structure of the pylon can be brought as close as possible to the wing, firstly because a part of the front lateral attachments is located in the pylon box, and no longer superposed vertically thereon. Furthermore, in the longitudinal direction, the structural continuity of the pylon box is not disrupted by the presence of the front lateral attachments, which favors a good draining of the forces in the box, in this longitudinal direction. Also, because the lateral flanges of the front lateral attachments are fixed onto the lateral panels of the pylon box, the width of the useful section of this box, at these attachments, proves to be advantageously great. This advantageously results in an additional saving in mass and bulk in the vertical direction, which is conducive to the installation of an engine of greater diameter, and/or to a higher installation of the engine to increase the ground clearance.

The invention preferably provides at least one of the following optional features, taken alone or in combination.

The reinforcing inner transverse rib is inclined so as to extend downward in the forward direction.

The reinforcing inner transverse rib is intended to be fixed in its bottom part to an engine attachment.

The top spar of the pylon box has a substantially planar form all along the pylon box.

The pylon box has a transverse section of continuous form all along the pylon box, this box extending on either side of the front lateral attachments in the longitudinal direction of the assembly, namely forward, and backward at least to a rear attachment of the means for fixing the primary structure of the attachment pylon onto the wing box. Thus, the pylon box is free of any section breaks, in particular, at the front lateral attachments.

The same applies for the two lateral panels of the pylon box, which are each continuous all along this box in the longitudinal direction with neither break nor interruption.

The wing box comprises a front spar onto which are fixed two reinforcing fittings respectively supporting the two clevises of the front lateral attachments.

Each of the front lateral attachments is designed so as to allow the absorption of the forces that are exerted in the longitudinal direction and in a vertical direction of the assembly, and one of the two front lateral attachments is also preferably designed so as to allow the absorption of the forces that are exerted in a transverse direction of the assembly.

The fixing means also comprise a rear attachment fixed onto a rear closing rib of the pylon box, and the rear attachment is preferably designed so as to allow only the absorption of the forces that are exerted in a vertical direction of the assembly.

The fixing means form an isostatic force absorption system.

Preferably, the web of the clevis crosses the top spar at a lateral cutout thereof, the cutout being open laterally outward.

Preferably, the upper part of each lateral flange takes the form of an ear.

Preferably, the upper part of the associated lateral panel, and the upper part of one of the two opposing lateral flanges of the transverse rib, are arranged between the two webs of the clevis.

Preferably, the two clevises, belonging respectively to the two front lateral attachments, are incorporated in one and the same part produced in a single piece.

Finally, an aircraft comprising at least one such assembly is also the subject of the invention.

Other advantages and features of the invention will become apparent from the nonlimiting detailed description herein below.

BRIEF DESCRIPTION OF THE DRAWINGS

This description will be given in light of the attached drawings in which.

DETAILED DESCRIPTION OF THE PREFERRED EMBODIMENTS

Figure 1:
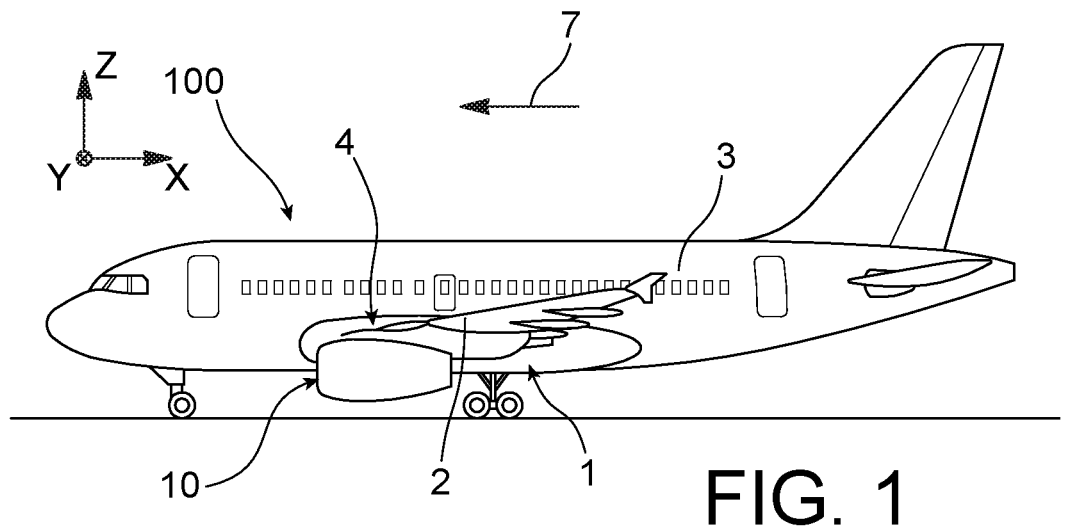
FIG. 1 represents a side view of an aircraft comprising an assembly according to the invention.

Referring to FIG. 1, an aircraft 100 is represented comprising a fuselage 3 onto which are fixed two wings 2 (only one visible in FIG. 1), each wing forming an integral part of an assembly 1 according to the invention. The assembly 1 supports a dual-flow and dual-body engine 10, such as an ultra-high bypass ratio (UHBR) jet engine. The assembly 1 comprises not only the wing 2, but also a pylon 4 for attaching the engine 10 interposed between the wing 2 and this engine.

Throughout the following description, by convention, the direction X corresponds to the longitudinal direction of the assembly 1 which can also be likened to the longitudinal direction of the engine 10, this direction X being parallel to a longitudinal axis of this engine. Also, the direction Y corresponds to the direction oriented transversely relative to the assembly 1, but can also be likened to the transverse direction of the engine. Finally, the direction Z corresponds to the vertical or heightwise direction, these three directions X, Y and Z being mutually orthogonal. Consequently, the engine 10 is suspended under the assembly 1, in the direction Z.

Also, the terms "front" and "rear" are considered in relation to a direction of advance of the aircraft encountered as a result of the thrust exerted by the engines 10, this direction being represented schematically by the arrow 7.

Figure 2:
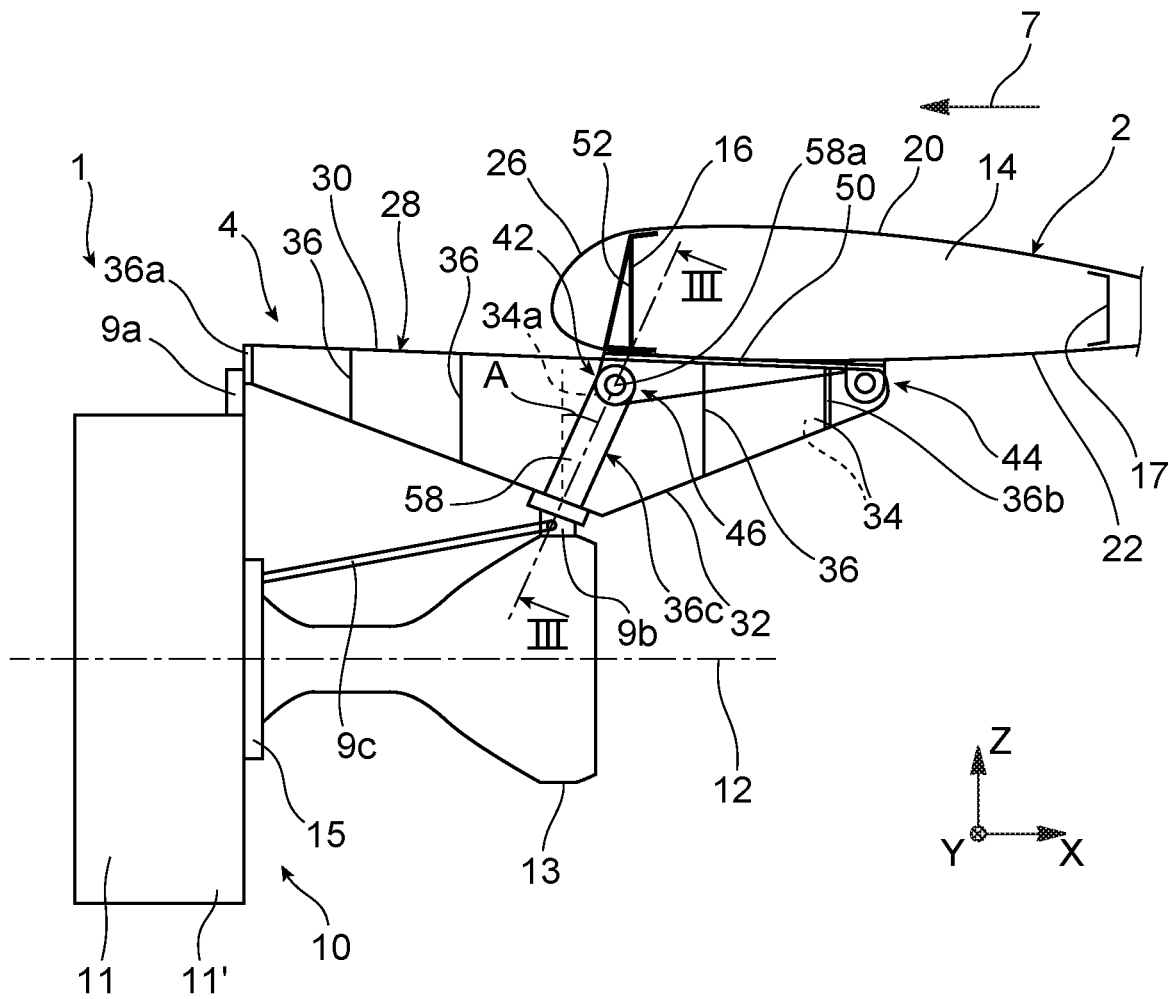
FIG. 2 is an enlarged side view, showing the assembly of FIG. 1 bearing an engine.

Referring now to FIG. 2, the assembly 1 is represented, under which is suspended the engine 10, of longitudinal axis 12. The wing 2 of this assembly 1 has a design that is conventional in as much as it comprises a wing box 14 extending in a direction of wing span. The wing box 14 is formed by a front spar 16, a rear spar 17, an upper surface top skin 20 and a lower surface bottom skin 22. The two spars 16, 17 are preferably substantially parallel, extending in the direction of span and spaced apart from one another in a direction of the cord of the wing. Substantially longitudinal reinforcing inner ribs (not represented) can be housed inside the wing box 14, by being fixed to each of the four box elements 16, 17, 20, 22, by rivets, bolts or similar elements. Furthermore, at the front of the wing box 14, the wing 2 comprises a cowling 26 forming the leading edge of the wing.

The other element of the assembly 1, the attachment pylon 4, comprises a primary structure 28 in the form of a box. The other constituent elements not represented of this pylon 4, of the secondary structure type ensuring the segregation and the holding of the systems while supporting aerodynamic fairings, are conventional elements similar to those encountered in the prior art. Consequently, no detailed description will be given thereof.

The primary structure 28, or rigid structure, allows the transmission to the wing box 14 of the static and dynamic forces generated by the engine 10. The box formed by this primary structure 28 extends over all the length of this primary structure, in the direction X. It has a design that is conventional, namely, that it is delimited at the top by a top spar 30, at the bottom by a bottom spar 32, and laterally by lateral panels 34. As can be seen in FIG. 2, the top spar 30 is situated at least partly under the wing box 14. With regard to this, it is noted that each of the abovementioned elements 30, 32, 34 can be produced as a single part, or by the assembly of several distinct parts. Furthermore, one and the same part can constitute all or part of several of these elements 30, 32, 34. One of the particular features of the primary structure, hereinafter called pylon box 28, lies in the substantially planar form of the top spar 30 all along this box in the direction X. This simplifies the pylon box 28, and allows for a better draining of the forces in the direction X within this box.

Furthermore, the pylon box 28 is equipped with reinforcing transverse ribs, some arranged substantially in planes YZ and distributed in the direction X. These are inner transverse ribs 36, a reinforcing transverse rib 36b closing the rear of the pylon box 28, called rear closing rib, and a reinforcing transverse rib 36a closing the front of the box, called front closing rib. The ribs 36, 36a, 36b link the outer elements of the box 30, 32, 34 to one another. Another reinforcing inner transverse rib 36c specific to the invention is present inside the pylon box. This reinforcing inner transverse rib 36c forms an integral part of the front lateral attachments 42, and mechanically links these wing attachments 42 to the rear engine attachment which will be described herein below. Unlike the other ribs, the reinforcing inner transverse rib 36c extends downward in the forward direction, while preferably remaining parallel to the direction Y. The angle A that it defines with the direction Z lies for example between 20 and 60°.

Figure 3:
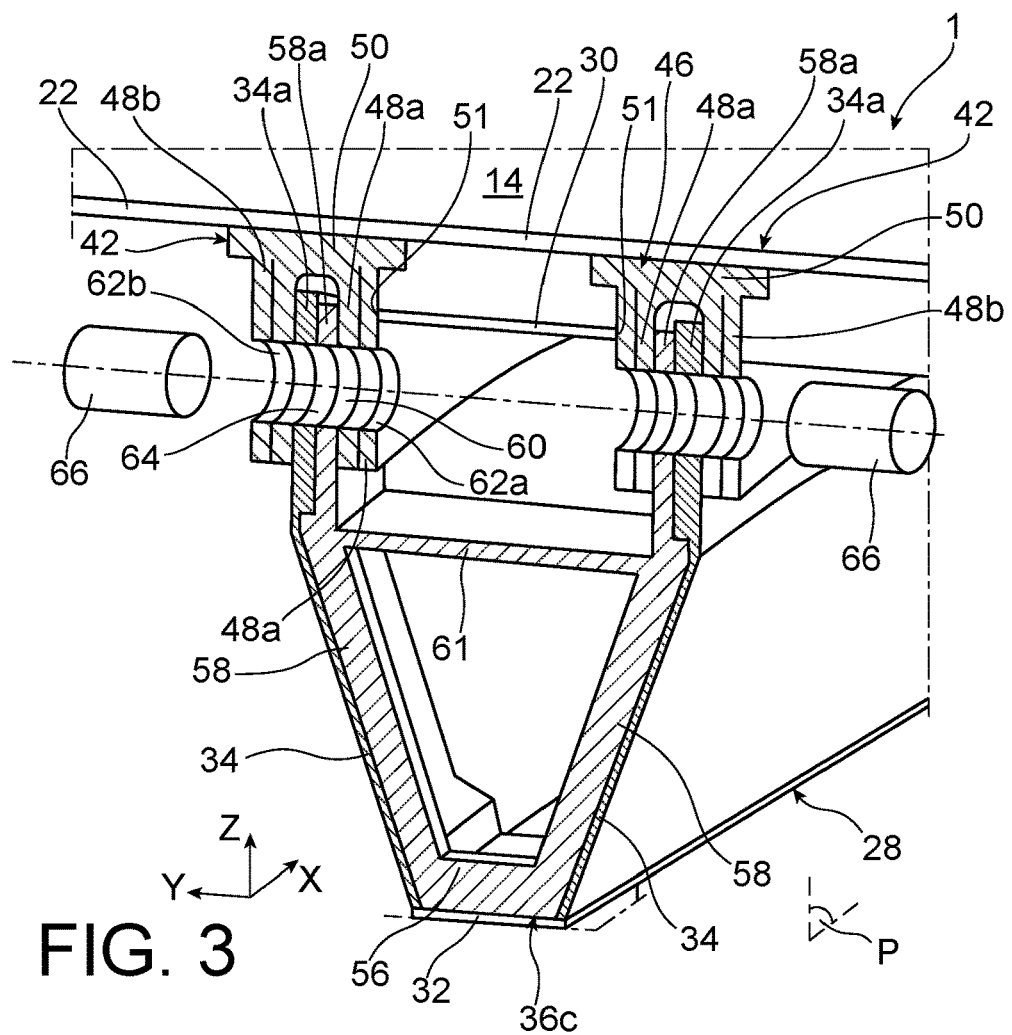
FIG. 3 is a cross-sectional view of the assembly shown in FIG. 2, along the cutting line III-III.
Figure 4:
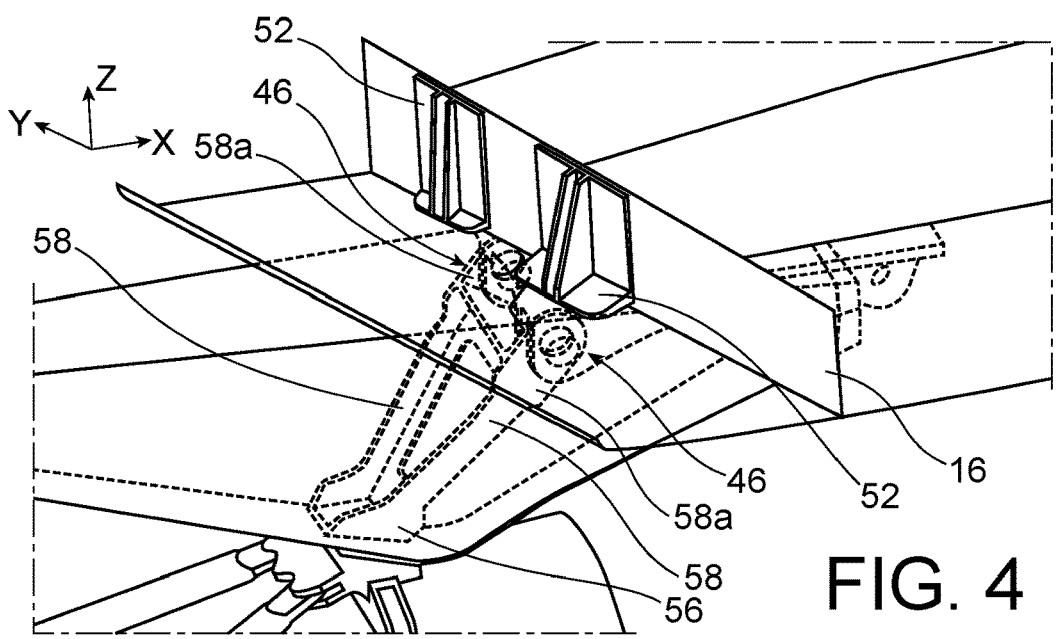
FIG. 4 is a perspective view of a part of the assembly shown in FIGS. 2 and 3.

The pylon box 28 has a transverse section YZ of generally square, rectangular or parallelogram form which extends downward in the form of a trapezium, as can be seen in FIG. 3 which will be described herein below. The transverse section is tapered in the direction X, but it nevertheless remains of continuous form all along the pylon box 28, which allows for a better draining of the forces in this box. In other words, the transverse section does not undergo any abrupt interruption of form along the pylon box 28. Preferably, this transverse section narrowing progressively from a median portion of the box incorporating the reinforcing inner transverse rib 36c, in the forward and backward directions.

The fixing of the engine 10 onto the pylon box 28 is performed in a conventional manner, which will now be briefly detailed. A front engine attachment 9a is provided, linking the front closing rib 36a to a fan casing 11 of the engine, or else to an intermediate casing outer shell 11'. Also provided is a rear engine attachment 9b linking a gas ejection casing 13 of the engine, to a bottom part of the pylon box 28. Preferably, the body of the rear engine attachment 9b is fixed onto the bottom spar 32 and onto a bottom end of the reinforcing inner transverse rib 36c, to promote a more powerful force between the engine and the wing. Furthermore, the two engine attachments 9a, 9b are complemented by two conventional thrust force absorption links 9c, which link a base 15 of the intermediate casing to the body of the rear engine attachment 9b.

These engine attachments 9a, 9b, 9c are produced in a conventional manner, that is known to the person skilled in the art. Together they form an isostatic force absorption system, just like the means for fixing the pylon box 28 onto the wing box 14, which are specific to the invention and which will now be described with reference to FIGS. 2 to 5.

These fixing means here consist of two front lateral attachments 42, and a rear attachment 44.

The two front lateral attachments 42 are of identical or similar design, and arranged substantially symmetrically relative to a median plan XZ of the assembly 1, this plane being referenced "P" in FIG. 3. Because of this, only one of the two front lateral attachments 42 will now be described.

The front lateral attachment 42 comprises, firstly, a clevis 46 secured to the wing box 14. This clevis 46 is fixed under the lower surface bottom skin 22, by conventional means of bolt or rivet type. It comprises two parallel webs 48a, 48b, each of these webs being duplicated so as to ensure a safety function in case of failure, this function being commonly known as "fail safe." Each web 48a, 48b is inscribed in a plane XZ, and extends rearward to substantially mid length of the wing box 14. The flange 50 of the clevis 46 is not only fixed onto the outer surface of the lower surface bottom skin 22, but also onto a reinforcing fitting 52 borne by the front spar 16 of the wing box. This fitting 52 is substantially in the form of a bracket and is housed at least partly in the leading edge zone of the wing delimited by the cowling 26. These are therefore two fittings 52 in bracket form which are spaced apart from one another along the front spar 16 of the wing box.

The web 48b, corresponding to the outer web of the clevis, is preferably located outside of the pylon box 28, facing or pressed against an outer surface of the lateral panel 34 associated with the attachment concerned. The other web 48a, corresponding to the inner web of the clevis, crosses the top spar 30 of the pylon box to be located at least partly housed inside this box 28. This web 48a is then said to be "embedded" in the pylon box 28, which makes it possible to reduce the vertical bulk of the assembly 1. In this respect, it is noted that the web 48a could cross the top spar 30 at an opening thereof, an opening which would then be defined by a closed line. However, in the embodiment described and represented, the web 48a crosses a lateral cutout 51 of this top spar 30, this lateral cutout being opened laterally outward. The two lateral cutouts 51 arranged on either side of the spar 30 result in a narrowing of width of this spar, at the front lateral attachments 42.

As an indication, it is noted that the two clevises 46 can be incorporated in one and the same part produced in a single piece, and whose base fixed onto the lower surface bottom skin 22 forms the two flanges 50 of the two clevises 46.

Moreover, the front lateral attachment 42 also comprises a portion of the reinforcing inner transverse rib 36c, as will be explained herein below. The reinforcing inner transverse rib 36c in fact comprises a bottom flange 56 fixed onto the bottom spar 32, and two opposing lateral flanges 58 fixed respectively onto the two opposing lateral panels 34. More specific each lateral flange 58 is fixed and pressed onto an inner surface of its associated lateral panel 34. The flange 58 is substantially parallel locally to its associated lateral panel 34, which extends continuously on either side of this flange in the direction X, to obtain a better draining of the forces passing through the box 28.

A transverse web 61 links the two lateral flanges 58, by passing through the interior of the box in the direction Y. The top part 58a of each lateral flange 58 is in the form of an ear, arranged protruding upward from the transverse web 61. This upper part 58a is passed through by a passage orifice 60 which is aligned transversely with the orifices 62a, 62b of the two clevis webs 48a, 48b, and with an orifice 64 of the associated lateral panel 34.

Consequently, the front lateral attachment 42 also comprises the upper part 58a of one of the two lateral flanges 58 of the reinforcing inner transverse rib 36c, forming the top end of this flange provided with the passage orifice 60. This upper part 58*a* of the flange is thus also embedded in the box.

The front lateral attachment 42 also comprises an upper part 34*a* of the lateral panel 34, namely the part of this panel 34 which is pressed against the upper part 58*a* of the corresponding flange.

As can be seen better in FIG. 3, the upper part 34*a* of the lateral panel and the upper part 58*a* of the associated flange 58 are preferentially arranged between the two webs 48*a*, 48*b* of the clevis 46, conferring on the latter a so-called "female" character. It should be noted that the two upper parts 34*a*, 58*a*, preferably pressed laterally against one another, together form one and the same path of forces. The redundancy ensures a "fail safe" safety function in case of failure of one of the two elements 34*a*, 58*a*, without the risk of propagation of the damage between these two same elements.

The attachment 42 is, finally, completed by a pin system 66 that is oriented transversely, and which passes in succession through each of the orifices 62*a*, 64, 60, 62*b*, the diameters of which are substantially identical. The pin system 66 performs the shear pin function, and can be duplicated in order to meet the "fail safe" safety criteria.

Figure 5:
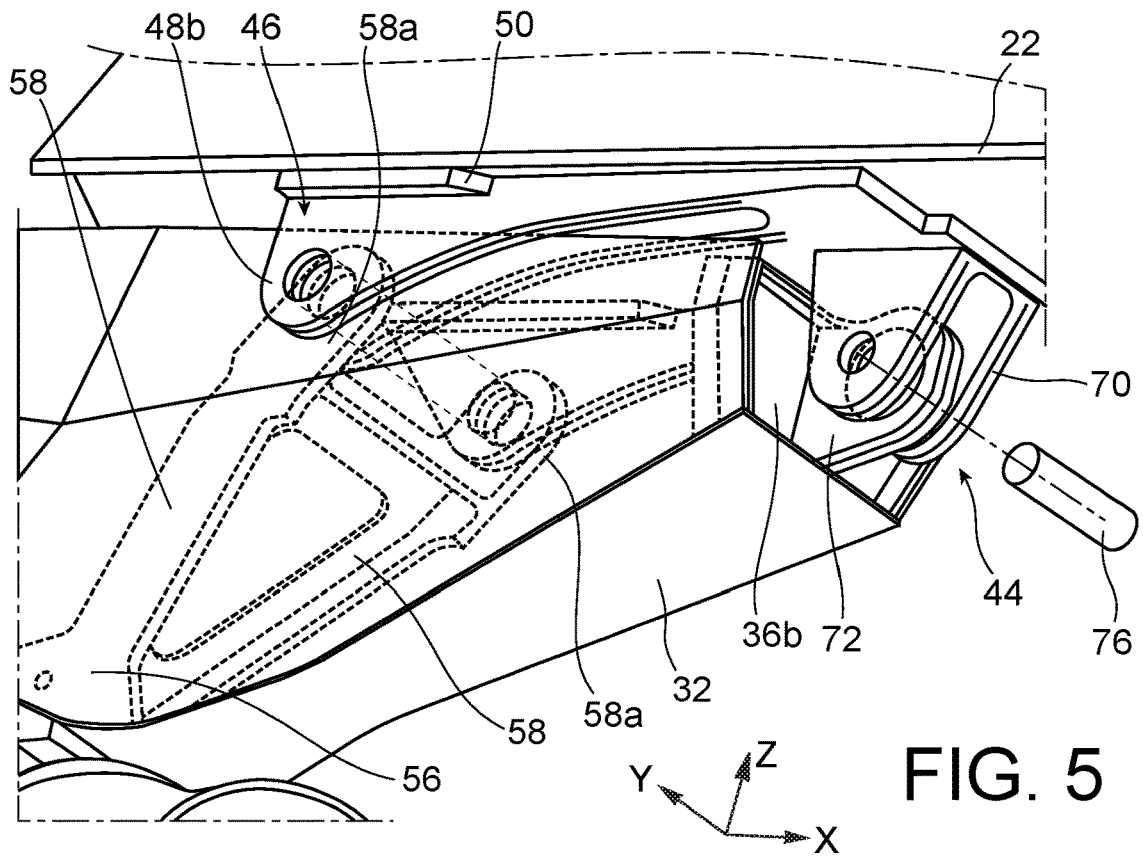
FIG. 5 is a perspective view similar to that of the preceding figure, from another viewing angle.

Referring more specifically to FIG. 5, the rear attachment 44 is shown, comprising a clevis 70 secured to the lower surface bottom skin 22 of the wing box. Here again, it is noted that this rear clevis 70 can be incorporated in the single piece forming the two clevises 46 of the front lateral attachments 42. Furthermore, the rear attachment 44 comprises a fitting 72 secured to the rear closing rib 36*b* of the pylon box 28. The rib 36*b* and the fitting 72 can each be duplicated to address the "fail safe" safety criteria. Furthermore, a pin system 76 oriented in the direction Y passes through the clevis 70 and the fitting 72.

Figure 6:
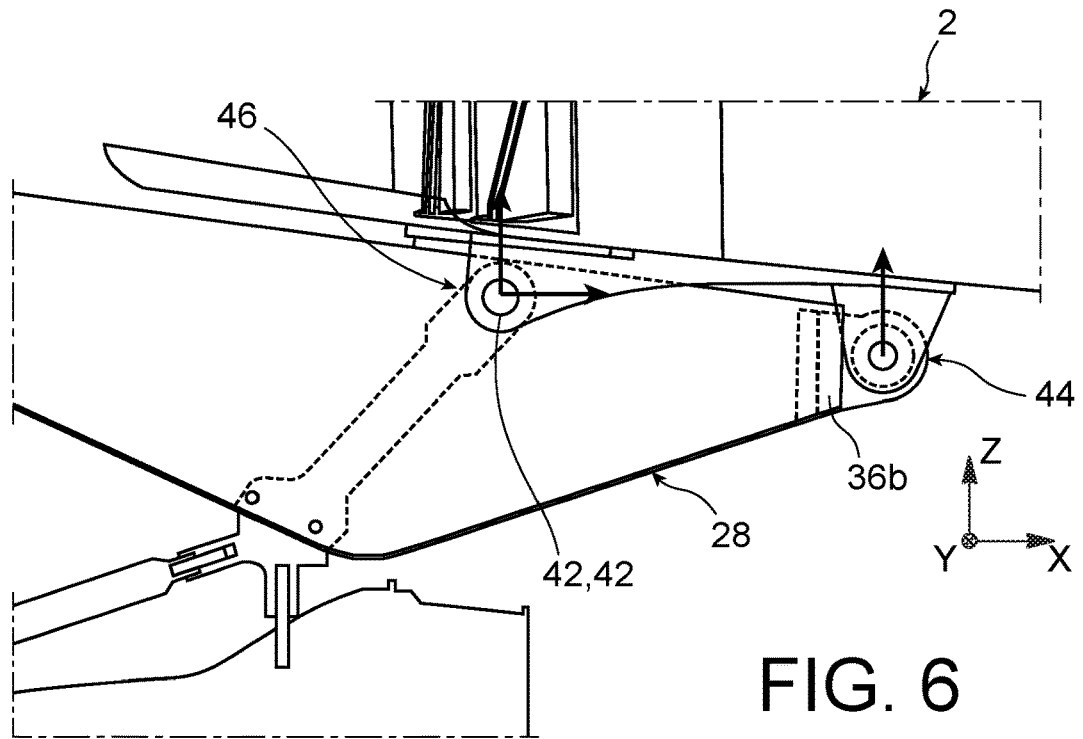
FIG. 6 is a side view of the assembly shown in the preceding figures, schematically showing the absorption of the forces performed by the means for fixing the pylon onto the wing.

Referring now to FIG. 6, the manner in which the forces are absorbed using the isostatic fixing means which have been previously described, and which allow for a simplified assembly of the pylon box 28 on the wing 2, will now be described. Each of the two front attachments 42 is provided to allow the absorption of the forces that are exerted in the two directions X and Z, and one of them also ensures the absorption of the forces in the direction Z. The other of these two front lateral attachments 42 does not absorb the transversely-oriented forces in normal operating conditions, but only in case of failure of the attachment 42 ensuring the absorption of the forces in the three directions X, Y and Z. The rear attachment 44, for its part, is designed to ensure the absorption of the forces only in the direction Z.

Obviously, various modifications can be made by the person skilled in the art to the invention which has just been described, purely by way of nonlimiting examples, and whose scope is defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for aircraft comprising:
an aircraft wing comprising a wing box;
an engine attachment pylon arranged under the wing, the pylon comprising a primary structure formed as a pylon box having a top spar extending at least partly under the wing box, and also having a bottom spar, two opposing lateral panels, and at least one reinforcing inner transverse rib comprising two opposing lateral flanges fixed respectively onto the two opposing lateral panels, each lateral flange being fixed onto an inner surface of its associated lateral panel which extends on either side of this flange in a longitudinal direction of the assembly; and
fixing means for fixing the primary structure of the attachment pylon onto the wing box,
wherein the fixing means comprise two front lateral attachments, each of these attachments comprising:
a clevis secured to the wing box, the clevis comprising two webs of which at least one crosses the top spar of the pylon box to be situated at least partly inside this pylon box;
an upper part of the associated lateral panel;
an upper part of one of the two opposing lateral flanges of the reinforcing inner transverse rib; and
a pin system passing through the two webs of said clevis, the upper part of the associated lateral panel, and the upper part of the lateral flange.

2. The assembly as claimed in claim 1, wherein said reinforcing inner transverse rib is inclined so as to extend downward in a forward direction.

3. The assembly as claimed in claim 1, wherein said reinforcing inner transverse rib is configured to be fixed in its bottom part to an engine attachment.

4. The assembly as claimed in claim 1, wherein said top spar of the pylon box has a substantially planar form all along the pylon box.

5. The assembly as claimed in claim 1, wherein said pylon box has a transverse section of continuous form all along the pylon box.

6. The assembly as claimed in claim 1, wherein said wing box comprises a front spar onto which are fixed two reinforcing fittings respectively supporting the two clevises of the front lateral attachments.

7. The assembly as claimed in claim 1, wherein each of the front lateral attachments is designed so as to allow absorption of the forces that are exerted in the longitudinal direction and in a vertical direction of the assembly, and wherein one of the two front lateral attachments is also designed so as to allow the absorption of the forces that are exerted in a transverse direction of the assembly.

8. The assembly as claimed in claim 1, wherein said fixing means also comprise a rear attachment fixed onto a rear closing rib of the pylon box, and wherein the rear attachment is designed so as to allow only absorption of the forces that are exerted in a vertical direction of the assembly.

9. The assembly as claimed in claim 1, wherein said fixing means form an isostatic force absorption system.

10. The assembly as claimed in claim 1, wherein the web crosses the top spar at a lateral cutout thereof, said cutout being open laterally outward.

11. The assembly as claimed in claim 1, wherein the upper part of each lateral flange comprises an ear.

12. The assembly as claimed in claim 1, wherein said upper part of the associated lateral panel, and said upper part of one of the two opposing lateral flanges of the transverse rib, are arranged between the two webs of the clevis.

13. The assembly as claimed in claim 1, wherein the two clevises, belonging respectively to the two front lateral attachments, are incorporated in one and the same part produced in a single piece.

14. An aircraft comprising at least one assembly as claimed in claim 1.

* * * * *